(12) United States Patent
Schutt

(10) Patent No.: US 8,502,074 B2
(45) Date of Patent: Aug. 6, 2013

(54) SEAL FOR ANODE CONNECTION TO CABLE AND METHOD OF USE

(75) Inventor: William R. Schutt, Doylestown, PA (US)

(73) Assignee: Matcor, Inc., Chalfont, PA (US)

( * ) Notice: Subject to any disclaimer, the term of this patent is extended or adjusted under 35 U.S.C. 154(b) by 375 days.

(21) Appl. No.: 12/952,380

(22) Filed: Nov. 23, 2010

(65) Prior Publication Data

US 2012/0125655 A1 May 24, 2012

(51) Int. Cl.
*H02G 15/08* (2006.01)
*H01R 4/00* (2006.01)
*H01B 3/30* (2006.01)
*H01B 17/00* (2006.01)

(52) U.S. Cl.
USPC ........ 174/77 R; 174/75 R; 174/76; 174/84 R; 174/93; 174/100 R; 174/145

(58) Field of Classification Search
USPC ............. 174/72 C, 74 A, 76, 77 R, 84 R, 174/102 C, 107, 110 R, 72 TR, 74 R, 75 R, 174/93, 145, 258
See application file for complete search history.

(56) References Cited

U.S. PATENT DOCUMENTS

| | | | | |
|---|---|---|---|---|
| 3,098,027 A | * | 7/1963 | Flower | 204/196.34 |
| 3,471,395 A | * | 10/1969 | Sumner | 204/196.1 |
| 3,970,488 A | | 7/1976 | Nelson | |
| 4,098,663 A | * | 7/1978 | Baboian | 204/196.1 |
| 4,195,197 A | * | 3/1980 | Kurr et al. | 174/78 |
| 4,245,134 A | * | 1/1981 | Oldham et al. | 174/70 S |
| 4,265,725 A | * | 5/1981 | Tatum | 204/196.1 |
| 4,267,029 A | * | 5/1981 | Massarsky | 204/196.34 |
| 4,292,099 A | * | 9/1981 | Dinger | 156/49 |
| 4,406,060 A | * | 9/1983 | Beinhaur | 29/855 |
| 5,185,921 A | * | 2/1993 | Pfaller et al. | 29/825 |
| 5,641,943 A | * | 6/1997 | Sawamura | 174/74 A |
| 5,875,547 A | * | 3/1999 | Larsson et al. | 29/869 |
| 6,086,070 A | * | 7/2000 | Tremoulet et al. | 277/586 |
| 2002/0046865 A1 | * | 4/2002 | Bertini et al. | 174/84 R |

FOREIGN PATENT DOCUMENTS

| | | |
|---|---|---|
| CN | 2600585 Y | 1/2004 |
| GB | 1349842 | 4/1974 |
| GB | 2319906 A | 6/1998 |

OTHER PUBLICATIONS

International Search Report for PCT/US2010/057760 mailed Jun. 30, 2011.

* cited by examiner

*Primary Examiner* — Timothy Thompson
*Assistant Examiner* — Sherman Ng
(74) *Attorney, Agent, or Firm* — Caesar, Rivise, Bernstein, Cohen & Pokotilow, Ltd.

(57) ABSTRACT

A sealing device and method of making it for insulating and sealing a joint electrically connecting a wire or ribbon anode to an electrical cable. The cable is insulated except at an open region where the wire anode is connected to it. The sealing device comprises a body of an insulating material molded in situ about the electrical joint to completely cover it and bond to portions of the electrically insulating covering contiguous with the joint to thereby insulate the joint and prevent the ingress of water or other materials into the joint.

15 Claims, 1 Drawing Sheet

SEAL FOR ANODE CONNECTION TO CABLE AND METHOD OF USE

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to cathodic protection systems and more particularly to devices for insulating and sealing electrical connections between a wire or strip anode and a cable or other structure to be protected.

BACKGROUND OF THE INVENTION

When wire type and rod type anodes are connected to the lead wire or conductor cable for the anode/anode assembly, the connection or joint must be both electrically sound and waterproof. If the connection is not waterproof, there is an almost certain risk of connection failure. To that end, various approaches have been taken to seal the electrical joint and isolate it from the ambient surroundings. Connection failures typically occur because the anode connection is almost always in some electrolyte, such as soil or water. As the DC current flows through the electrical joint and if it is exposed to the moisture or soil, it will corrode and fail. Where the structure to be protected comprises a cable, whose conductors are typically copper the anode used is generally made of a noble metal combination, such as mixed metal oxide (MMO) over titanium or platinum over niobium/copper. However other anode materials may be used.

Heretofore the electrical joint connecting a wire or ribbon anode to a cable or other elongated structure has been sealed and insulated using a series of steps of hand applied materials. In the simplest form, the electrical joint is covered by heat shrink sleeve that may or may not contain a mastic or sealant that melts when heated. The sleeve is slid over the connection and heated with a heat gun either electric or propane. The process is all done by hand. Matcor, Inc., a well known company in the field of cathodic protection systems, and which is the licensee of the subject invention, has typically taken the foregoing approach to sealing and insulating wire anode joints. In particular, the standard connection made by Matcor, Inc. consists of several steps including: brushing the connection (the electrical joint) with a sealant, such as 3M SKOTCHKOTE™ structural polyurea coating, sliding a heat shrinkable sleeve over the connection, partially heating the heat shrinkable sleeve and while it is still open at one end and then injecting an additional sealing material, e.g., a hot melt sealant, into the sleeve using a hot melt gun. After that is accomplished the heat shrinkable sleeve is heated further to finishing heating and shrinking it about the joint.

In some simple older forms of waterproofing, the electrical joint is covered with a brush-on sealer such as the 3M SKOTCHKOTE™ structural polyurea coating and then wrapped with two layers of tape. This connection is rarely used today.

As should be appreciated by those skilled in the art, all of the above prior art approaches to sealing the electrical joint rely on the workmanship of the person doing the work, so that in some cases a the joint may not be sealed and insulated properly. The subject invention addresses that problem.

All references cited and/or identified herein are specifically incorporated by reference herein.

SUMMARY OF THE INVENTION

In accordance with one aspect of the invention there is provided a sealing device for insulating and sealing a joint electrically connecting an elongated anode (e.g., a wire or ribbon anode) to an elongated electrical conductor (e.g., a stranded cable). The elongated electrical conductor has an electrically insulating covering (e.g., KYNAR® polyvinylidene fluoride (PVDF) thereon except at an open region where the wire anode is connected to the elongated electrical conductor. The sealing device comprises a body of an insulating material (e.g., KYNAR® polyvinylidene fluoride, high molecular weight polyethylene, etc.) molded in situ about the joint to completely cover the joint and bond to portions of the electrically insulating covering contiguous with the open region to thereby insulate the joint and prevent the ingress of water or other materials into the joint.

In accordance with another aspect of this invention there is provided a joint electrically connecting an elongated anode to an elongated electrical conductor. The elongated electrical conductor has an electrically insulating covering thereon except at an open region where the elongated anode is connected to the elongated electrical conductor. The joint additionally comprises a sealing device comprising a body of an insulating material molded in situ about the joint to completely cover the joint and bond to portions of the electrically insulating covering contiguous with the open region to thereby insulate the joint and prevent the ingress of water or other materials into the joint.

In accordance with still another aspect of this invention there is provided a method for insulating and sealing a joint electrically connecting an elongated anode to an elongated electrical conductor. The elongated electrical conductor has an electrically insulating covering thereon except at an open region where the elongated anode is connected to the elongated electrical conductor. The method comprises molding a body of an insulating material in situ about the joint to completely cover the joint and bond to portions of the electrically insulating covering contiguous with the open region to thereby insulate the joint and prevent the ingress of water or other materials into the joint.

DETAILED DESCRIPTION OF THE PREFERRED EMBODIMENT

Figure 1:
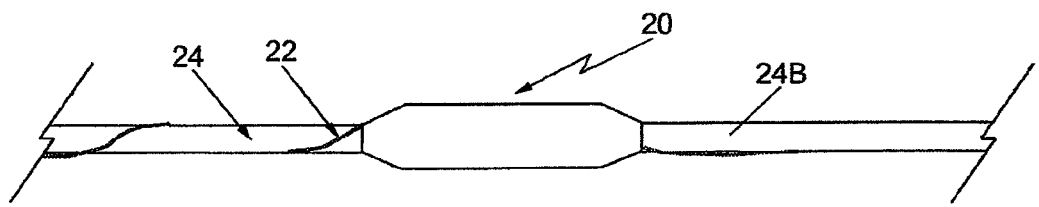
FIG. 1 is a side elevation view of a portion of a wire anode electrically connected to an electrical cable at an electrical joint, which has been insulated and rendered waterproof by use of a sealing device formed in accordance with one aspect of this invention.
Figure 2:
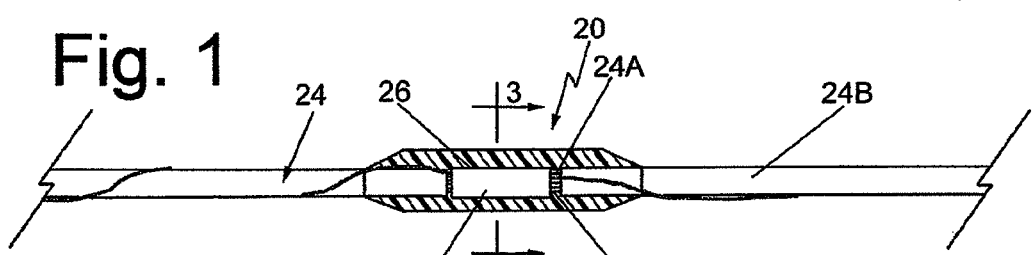
FIG. 2 is a side elevation view, similar to FIG. 1, but showing a portion of the sealing device broken away along a vertical section, to show the details of the electrical joint.

Referring now to the various figures of the drawing wherein like reference characters refer to like parts, there is shown in FIG. 1 a sealing device 20 for insulating and sealing a joint electrically connecting an elongated wire or ribbon anode 22 to an elongated electrical conductor, e.g., a cable 24. Some details of the anode 22 and the cable 24 will be described later. Suffice it for now to state that the anode 22 is an elongated thin flexible member, e.g., a wire, a ribbon, a tube, etc., which can be any conventional construction and is formed of an electrically conductive material, e.g., a noble metal combination, such as a mixed metal oxide (MMO) over titanium or platinum over niobium/copper, or any other conventional anode materials. The cable 24 can also be of any conventional construction. In the embodiment shown the cable 24 comprises a plurality of electrically conductive, e.g., copper, strands or filaments 24A having an electrically insulating covering or coating 24B, e.g., KYNAR® polyvinylidene fluoride, thereon.

Figure 3:
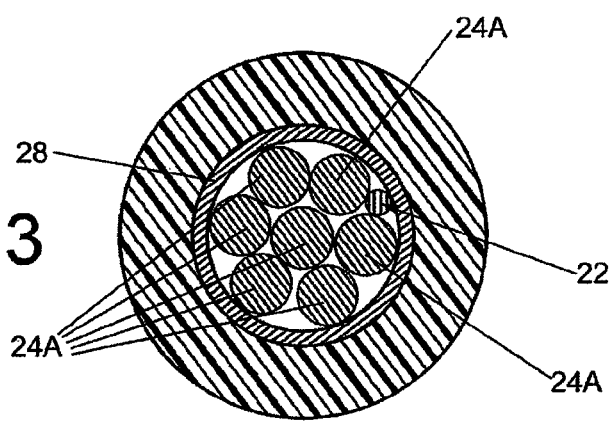
FIG. 3 is an enlarged sectional view taken along line 3-3 of FIG. 2.

In accordance with one preferred aspect of this invention the sealing device 20 is molded in situ, e.g., injection molded (as will be described later with reference to FIG. 4), about the electrical joint 26 connecting the anode 22 to the cable 24 to establish a waterproof/insulation covering for the anode-to-cable connection. In the exemplary embodiment shown the electrical connection between the anode 22 and the cable 24 at the joint 26 is effected by use of an electrically conductive crimp sleeve 28. To that end, a portion of the insulation 24A of the cable is removed at the point where the electrical connection is to be made. This creates an open region 30 exposing the electrical strands or filaments 24A. A portion of the elongated anode 24 is disposed over the filaments 24A in the region 30 and the crimp sleeve 28 is disposed thereabout. The sleeve is then crimped in place to result in tightly compressing the underlying portion of the wire anode 22 into engagement with the strands 24A of the cable, as best seen in FIG. 3, thereby electrically connecting the anode to the cable's conductive filaments. It should be pointed out at this juncture that in lieu of using a crimp sleeve to effect the electrical interconnection of the anode to the cable, other means can be used. For example, the anode may be soldered, welded or brazed to the filaments of the cable at the open region 30.

Figure 4:
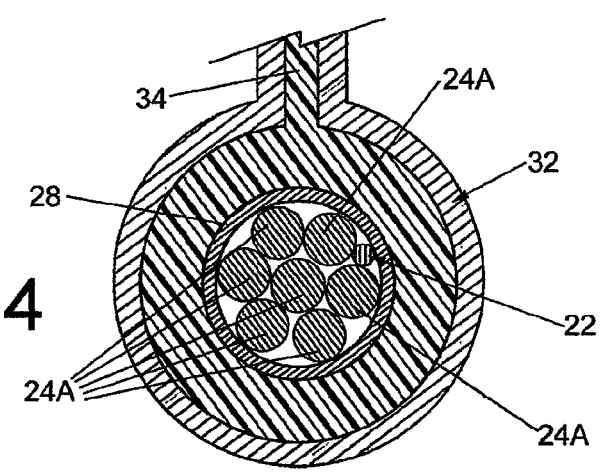
FIG. 4 is a vertical sectional view, similar to FIG. 3, showing the formation of the sealing device shown in FIGS. 1-3.

Irrespective of how the electrical joint 26 is produced, it must be insulated and sealed to protect it from the environment in which it will be disposed. That is the function of the sealing device 20. The sealing device is 20 formed and applied to the joint 26 as best seen in FIG. 4 by disposing a hollow injection mold 32 about the joint 26 and injection molding the device on the joint. The mold 32 includes a cylindrically shaped cavity having a tapered leading end and a tapered trailing end. The outside diameter of the cylindrical portion of the cavity is greater than the outside diameter of the joint 26 to create an annular space therebetween. The mold 32 includes an inlet port 34 into which a flowable insulating material is injected to fill the annular space with the insulating material. Moreover, the flowable insulating material fills up all of the voids in the joint which are contiguous with the annular space surrounding the joint, thereby totally encapsulating the joint.

In accordance with one preferred aspect of this invention the flowable insulating material comprises the same material as that making up the insulation 24B on the cable 24 so that when it is injected into the mold and sets up (hardens) it chemically bonds to the insulation of the cable thereby forming a body which is bonded to the joint, e.g., is integral with the cable insulation on either sides of the joint. However, there will be other cases where the material injected into the mold to form the body of the sealing device 20 may be of different material than that found in the cable insulation in order to provide addition benefits. In any case the molding of the body of the sealing device in situ on the joint has the effect of bonding that body to the joint and to the insulation of the cable on either side of the joint. This results in a joint which is electrically insulated and waterproof.

As will be appreciated by those skilled in the art, in practice a plurality of electrical joints 26 will be made at sequentially spaced locations along a long cable. Each joint will be sealed and insulated as discussed above.

The following constitutes one exemplary embodiment of a typical electrical joint 26 sealed and insulated by a sealing device 20 constructed in accordance with this invention. The anode is a MMO wire anode which is either of 0.31" or 0.62" outside diameter. The cable 24 is composed of stranded and annealed copper wires 24B which are covered by a high molecular weight polyethylene (HMWPE or HMPE) insulating cover or coating 24B. The outside diameter of the cable 24 with the 0.31" anode is 0.36", and is 0.4" with the 0.62" anode. The length of the open region 30 is approximately 1.375". The length of the crimp sleeve 28 is approximately 1.2", with the outside diameter of the sleeve being 0.365", but will vary with the crimp. The length of the body of the sealing device 20 is approximately 3.31", with an outside diameter of 0.5". The length of each of the tapered ends of the sealing device 20 is 0.5".

While the subject invention has been disclosed for effecting the insulation and sealing of an electrical joint between a wire or ribbon anode and an insulated cable, this invention is not so limited. Thus, it is contemplated that the subject invention can be used in any suitable cathodic protection system making use of a thin, elongated anode.

As should be appreciated from the foregoing the subject invention offers various advantages over the prior art. For example, the sealing device and method of making it does not rely on the workmanship of the person applying it. Thus, the quality of the resulting sealed joint will be consistent. This very important on linear anodes where as many as one hundred forty (140) connections may exist for one assembly. The device of this invention is chemically bonded to the insulated conductor cable and can be of the same material as the insulation on the insulated cable to ensure a good bond. This means that it is not possible for the waterproofing/sealant to be pulled off, as is the case with the prior art usage heat shrink sleeves to effect insulation and sealing. Moreover, when the anode assembly of the prior art is pulled or placed under tension the conductor cable 24 can stretch, with the heat shrink sleeve remaining of the same length as when initially applied, thereby leaving the bare conductors (e.g., the copper strands) of the joint exposed. As mentioned above, the subject invention can make use of any material, such as KYNAR® polyvinylidene fluoride, which is commonly used as cable insulation for protection against chlorine. It is not easy to cover a KYNAR® polyvinylidene fluoride insulated cable-wire anode joint with a heat shrinkable sleeve, like used in the prior art. With the subject invention, that is not an issue. Further still, since the sealing device of the subject invention is molded in situ about the joint, the insulating material making up the body will fill all of the cavities and voids at the joint. This should be contrasted with the prior art where voids can and do frequently occur. In addition, the thickness of the insulation/sealing body formed over the joint with this invention will be more uniform than with the prior art. The uniform covering thickness offers better electrical protection to the connection.

Without further elaboration the foregoing will so fully illustrate our invention that others may, by applying current or future knowledge, adopt the same for use under various conditions of service.

I claim:

1. A sealing device for insulating and sealing a joint electrically connecting an elongated wire or ribbon anode to an elongated electrical conductor, the elongated electrical conductor having an electrically insulating covering thereon except for a first open region where the wire or ribbon anode is electrically connected to the elongated electrical conductor, said sealing device comprising a body of an electrically insulating material molded in situ about the joint whereupon said body of an electrically insulating material completely covers and encapsulates the joint and is integrally bonded directly to portions of the electrically insulating covering of the elongated electrical conductor contiguous with the first open region to thereby electrically insulate the joint and prevent the ingress of water or other materials into the joint.

2. The sealing device of claim 1 wherein said material of said sealing device is the same as the material making up the electrically insulated covering of the elongated electrical conductor.

3. The sealing device of claim 2 wherein said material of said sealing device comprises KYNAR® polyvinylidene fluoride.

4. The sealing device of claim 1 wherein said material of said sealing device comprises high molecular weight polyethylene.

5. The sealing device of claim 1 wherein said body has a tapered leading end and a tapered trailing end.

6. A joint electrically connecting an elongated wire or ribbon anode to an elongated electrical conductor, said elongated electrical conductor having an electrically insulating covering thereon except for a first open region where said elongated wire or ribbon anode is electrically connected to said elongated electrical conductor, said joint additionally comprising a sealing device comprising a body of an electrically insulating material molded in situ about the joint whereupon said body of an electrically insulating material completely covers and encapsulates the joint and is integrally bonded directly to portions of said electrically insulating covering of the elongated electrical conductor contiguous with said first open region to thereby electrically insulate said joint and prevent the ingress of water or other materials into said joint.

7. The joint of claim 6 wherein said elongated anode is a wire anode.

8. The joint of claim 6 wherein said elongated anode is a ribbon anode.

9. The joint of claim 6 wherein said joint additionally comprises an electrically conductive sleeve surrounding and engaging said elongated electrical conductor and said elongated anode.

10. The joint of claim 6 wherein said material of said sealing device is the same as said material making up said electrically insulated covering of said elongated electrical conductor.

11. The joint of claim 10 wherein said material of said sealing device comprises KYNAR® polyvinylidene fluoride.

12. The joint of claim 6 wherein said material of said sealing device comprises high molecular weight polyethylene.

13. The joint of claim 6 wherein said body has a tapered leading end and a tapered trailing end.

14. The joint of claim 6 wherein said elongated anode is a mixed metal oxide anode.

15. The joint of claim 6 wherein said elongated anode is a noble metal anode.

* * * * *